(12) United States Patent
Swaminathan

(10) Patent No.: US 9,443,066 B2
(45) Date of Patent: *Sep. 13, 2016

(54) DECRYPTING CONTENT SAMPLES INCLUDING DISTINCT ENCRYPTION CHAINS

(71) Applicant: Adobe Systems Incorporated, San Jose, CA (US)

(72) Inventor: Viswanathan Swaminathan, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/577,981

(22) Filed: Dec. 19, 2014

(65) Prior Publication Data

US 2015/0113287 A1    Apr. 23, 2015

Related U.S. Application Data

(63) Continuation of application No. 12/981,456, filed on Dec. 29, 2010, now Pat. No. 8,938,619.

(51) Int. Cl.
*G06F 11/30* (2006.01)
*G06F 21/10* (2013.01)
(Continued)

(52) U.S. Cl.
CPC ............ *G06F 21/10* (2013.01); *H04L 9/0618* (2013.01); *H04L 9/0637* (2013.01); *H04L 9/0822* (2013.01); *H04L 9/0825* (2013.01);
(Continued)

(58) Field of Classification Search
CPC ............... G06F 21/10; G06F 2221/07; G06F 2221/2107; H04L 9/0637; H04L 9/0822; H04L 9/0618; H04L 9/0825; H04L 2209/60
USPC ....... 713/150, 160, 189, 151, 170, 171, 190; 380/37, 42; 711/170, 171; 709/231

See application file for complete search history.

(56) References Cited

U.S. PATENT DOCUMENTS

| 6,055,316 A * | 4/2000 | Perlman ................ H04L 9/0643 380/262 |
| 7,274,792 B2 | 9/2007 | Chin et al. |
| 7,356,147 B2 | 4/2008 | Foster et al. |

(Continued)

OTHER PUBLICATIONS

Final Office Action, U.S. Appl. No. 12/981,456, Jul. 11, 2014, 7 pages.

(Continued)

*Primary Examiner* — Thu Ha Nguyen
(74) *Attorney, Agent, or Firm* — Wolfe-SBMC

(57) ABSTRACT

Embodiments may be configured to receive a protected version of content that includes multiple encrypted content samples. In various embodiments, each encrypted content sample includes multiple encrypted blocks. For a given encrypted content sample, different sets of encrypted blocks in that sample may form different encryption chains. The protected version of the content may further include decryption information for decrypting the encrypted content samples. The decryption information may include at least some initialization vectors generated dependent upon non-content information that is not included in the protected version of the content. The non-content information may be from a different protected version of the content. Embodiments may be configured to use the decryption information to decrypt one or more of the encrypted content samples.

20 Claims, 7 Drawing Sheets

(51) Int. Cl.
*H04L 9/06* (2006.01)
*H04L 9/08* (2006.01)

(52) U.S. Cl.
CPC ... *G06F2221/07* (2013.01); *G06F 2221/2107* (2013.01); *H04L 2209/60* (2013.01)

(56) References Cited

U.S. PATENT DOCUMENTS

| | | | |
|---|---|---|---|
| 7,383,438 B2 | 6/2008 | Fahrny et al. | |
| 7,684,568 B2 | 3/2010 | Yonge, III et al. | |
| 7,716,662 B2 * | 5/2010 | Seiden | G06F 8/61 717/173 |
| 7,752,491 B1 * | 7/2010 | Liikanen | G06F 11/2087 714/6.13 |
| 7,916,421 B1 * | 3/2011 | Liikanen | G11B 19/045 360/77.01 |
| 7,970,132 B2 | 6/2011 | Fahrny et al. | |
| 8,081,755 B2 | 12/2011 | Zhu et al. | |
| 8,280,863 B2 | 10/2012 | Pantos et al. | |
| 8,300,812 B2 | 10/2012 | Van De Ven | |
| 8,301,725 B2 | 10/2012 | Biderman et al. | |
| 8,520,839 B2 | 8/2013 | Gammel et al. | |
| 8,527,750 B2 | 9/2013 | Swaminathan | |
| 8,737,606 B2 | 5/2014 | Taylor et al. | |
| 8,938,619 B2 | 1/2015 | Swaminathan | |
| 2003/0002665 A1 | 1/2003 | Sako et al. | |
| 2003/0056118 A1 | 3/2003 | Troyansky et al. | |
| 2005/0027985 A1 * | 2/2005 | Sprunk | H04L 9/3263 713/171 |
| 2006/0137015 A1 | 6/2006 | Fahrny et al. | |
| 2006/0184790 A1 | 8/2006 | Oliveira et al. | |
| 2006/0190970 A1 * | 8/2006 | Hellman | H04N 7/163 725/75 |
| 2007/0014536 A1 * | 1/2007 | Hellman | G11B 27/034 386/259 |
| 2007/0033419 A1 * | 2/2007 | Kocher | G06F 21/10 713/193 |
| 2007/0140318 A1 * | 6/2007 | Hellman | H04H 20/106 375/130 |
| 2007/0237327 A1 | 10/2007 | Taylor et al. | |
| 2008/0101604 A1 * | 5/2008 | Kocher | G11B 20/00086 380/210 |
| 2009/0052661 A1 * | 2/2009 | Fahrny | H04N 7/162 380/42 |
| 2009/0125726 A1 * | 5/2009 | Iyer | G06F 11/1068 713/189 |
| 2009/0235041 A1 * | 9/2009 | Harris | G06F 3/0613 711/170 |
| 2010/0223457 A1 * | 9/2010 | Durham | H04L 9/0827 713/152 |
| 2011/0299685 A1 * | 12/2011 | Hall | H04L 9/0822 380/273 |
| 2012/0144195 A1 * | 6/2012 | Nair | H04L 63/0428 713/168 |
| 2012/0173865 A1 | 7/2012 | Swaminathan | |
| 2012/0173880 A1 | 7/2012 | Swaminathan | |
| 2012/0185699 A1 | 7/2012 | Arnold | |
| 2012/0226900 A1 * | 9/2012 | Rodgers | G06F 21/10 713/150 |
| 2012/0246462 A1 * | 9/2012 | Moroney | H04L 63/10 713/151 |
| 2013/0121489 A1 | 5/2013 | Pestoni | |
| 2013/0129085 A1 | 5/2013 | Swaminathan | |
| 2013/0246643 A1 * | 9/2013 | Luby | H04N 21/23439 709/231 |
| 2013/0311745 A1 * | 11/2013 | Harris | G06F 3/0611 711/171 |
| 2014/0074719 A1 * | 3/2014 | Gressel | G06Q 20/3827 705/64 |
| 2014/0098203 A1 * | 4/2014 | Husak | G03B 33/00 348/56 |
| 2015/0082337 A1 * | 3/2015 | Mamidwar | H04N 21/23895 725/31 |
| 2016/0088322 A1 * | 3/2016 | Horev | H04N 21/8456 725/14 |

OTHER PUBLICATIONS

Non-Final Office Action, U.S. Appl. No. 12/981,455, Nov. 23, 2012, 10 pages.
Non-Final Office Action, U.S. Appl. No. 12/981,456, Oct. 16, 2013, 7 pages.
Notice of Allowance, U.S. Appl. No. 12/981,455, May 1, 2013, 17 pages.
Notice of Allowance, U.S. Appl. No. 12/981,456, Sep. 12, 2014, 4 pages.

* cited by examiner

DECRYPTING CONTENT SAMPLES INCLUDING DISTINCT ENCRYPTION CHAINS

RELATED APPLICATION

This application is a continuation of and claims priority to U.S. patent application Ser. No. 12/981,456 filed Dec. 29, 2010 entitled "System and Method for Decrypting Content Samples Including Distinct Encryption Chains", the disclosure of which is incorporated by reference herein in its entirety.

BACKGROUND

Description of the Related Art

To combat unauthorized consumption of content, some content owners have adopted an approach to protecting their content known as digital rights management ("DRM"), which may include various techniques for limiting access of electronic content to authorized individuals and/or enforcing other restrictions on the use of such content. Typically, clear content that is to be protected by DRM is typically encoded and packaged into an encrypted form. At packaging time, the packaging unit responsible for packaging content may utilize various types of encryption algorithms for encrypting content. In some cases, these encryption algorithms may encrypt content based on a cryptographic key, which may be selected or generated in a random fashion. At some point, the encrypted content may be provided to an electronic device associated with a content consumer. For instance, the consumer may pay a one-time fee or a recurring subscription fee to access the content electronically. To view the content in unencrypted form on the consumer's electronic device, the device may be required to obtain a respective content license that includes the correct cryptographic key for decrypting the content.

In some cases, decryption schemes and/or content formats may vary across consumer devices or platforms. These differences may be accommodated at packaging time. For instance multiple different encryption and formatting schemes may be applied to clear content to generate multiple different content versions that are compatible with different consumer devices or platforms.

SUMMARY

Embodiments of a system and method for decrypting content samples including distinct encryption chains are described. In various embodiments, different protected (e.g., encrypted) versions of the same content may be generated without redundantly encrypting the content. For instance, embodiments may enable content to be encrypted once and assembled into various different formats while keeping the encrypted content bit compatible across such formats. In various embodiments, a first protected version of content may be generated by packetizing unencrypted content (e.g., according to a media transport stream) into multiple packets. The packetized content may include content information (e.g., actual content, such as video or audio data) as well as non-content information (e.g., packet headers). In some cases, subgroups of the packets may be further grouped into individual files (e.g., for network transport).

In any case, the packetized content may be chain encrypted on a block-by-block basis. For instance, block cipher encryption may be utilized to encrypt the packetized content with an encryption key and multiple initialization vectors. In various embodiments, the encryption result of this encryption process may serve as a first protected version of the content. In various embodiments, one or more different protected versions of the content may be additionally generated without re-encrypting the content that was encrypted to generate the first protected version of the content. For instance, embodiments may identify encrypted blocks of the first protected version that correspond to actual content data while discarding encrypted blocks that correspond to non-content information (e.g., packet or file headers).

In various embodiments, the blocks that represent encrypted content may be aggregated into samples, which may in some cases be larger than the packet payloads of the packetized content described above. During the extraction process, contiguous encryption chains may be broken (e.g., because at least some blocks corresponding to non-content information may be discarded). Accordingly, samples may include multiple different encryption chains. In various embodiments, to ensure that a second protected version of the content that includes the aforesaid samples can be decrypted properly, embodiments may include decryption information within that second protected version of the content. In various embodiments, this decryption information may specify multiple initialization vectors for decrypting each distinct encryption chain within samples. For instance, each sample may include multiple distinct encryption chains and sample header information for that sample may specify an initialization vector to be used for decrypting each of those encryption chains. As described in more detail herein, at least some of those initialization vectors may be dependent upon non-content information of the first protected version of the content (e.g., non-content information that was discarded during the extraction of content blocks during the creation of the second version of the protected content).

Embodiments may include various decryption techniques for decrypting encrypted content samples that are generated according to the techniques described herein. Embodiments may be configured to receive a protected version of content that includes multiple encrypted content samples. In various embodiments, each encrypted content sample includes multiple encrypted blocks. For a given encrypted content sample, different sets of encrypted blocks in that sample may form different encryption chains. The protected version of the content may further include decryption information for decrypting the encrypted content samples. The decryption information may include at least some initialization vectors generated dependent upon non-content information that is not included in the protected version of the content. The non-content information may be from a different protected version of the content. Embodiments may be configured to use the decryption information to decrypt one or more of the encrypted content samples.

Figure 1:
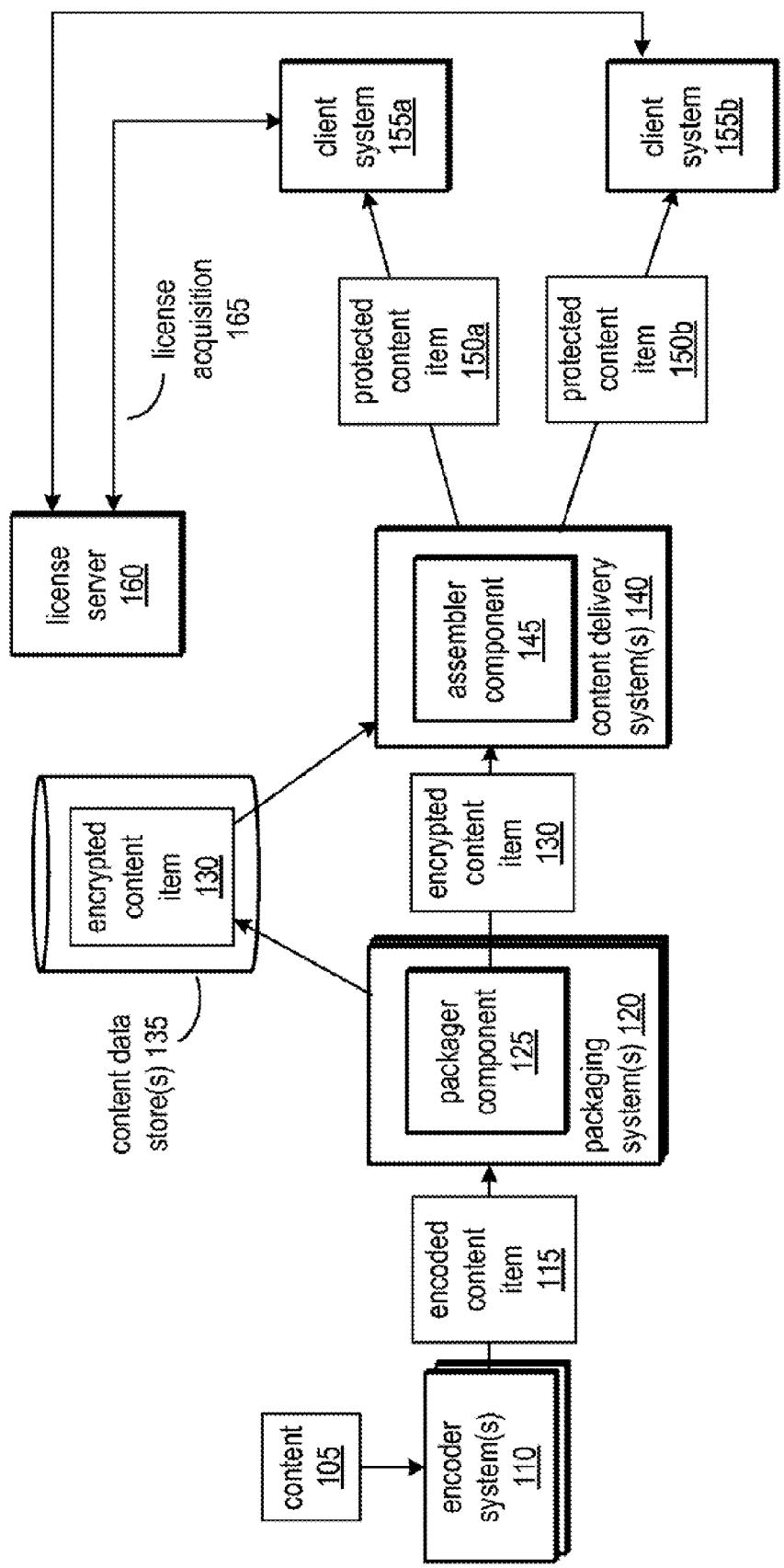
FIG. 1 illustrates block diagram of an example system in which multiple protected content formats may be generated without redundant encryption of content, according to some embodiments.

While the system and method for decrypting content samples including distinct encryption chains is described herein by way of example for several embodiments and illustrative drawings, those skilled in the art will recognize that the system and method for decrypting content samples including distinct encryption chains is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for decrypting content samples including distinct encryption chains as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for decrypting content samples including distinct encryption chains are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments include various encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client"). It should be understood that the terms "client" and "server" do not impose any limitation on the operation, configuration, or implementation of such elements. It should be understood that these terms are used only as convenient nomenclature. Indeed, various embodiments are need not be limited by the principles of a conventional client-server architecture.

In various instances, this detailed description may refer to content items (which may also be referred to as "content data," "content information" or simply "data" or "information"). In some instances, content items may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 8:
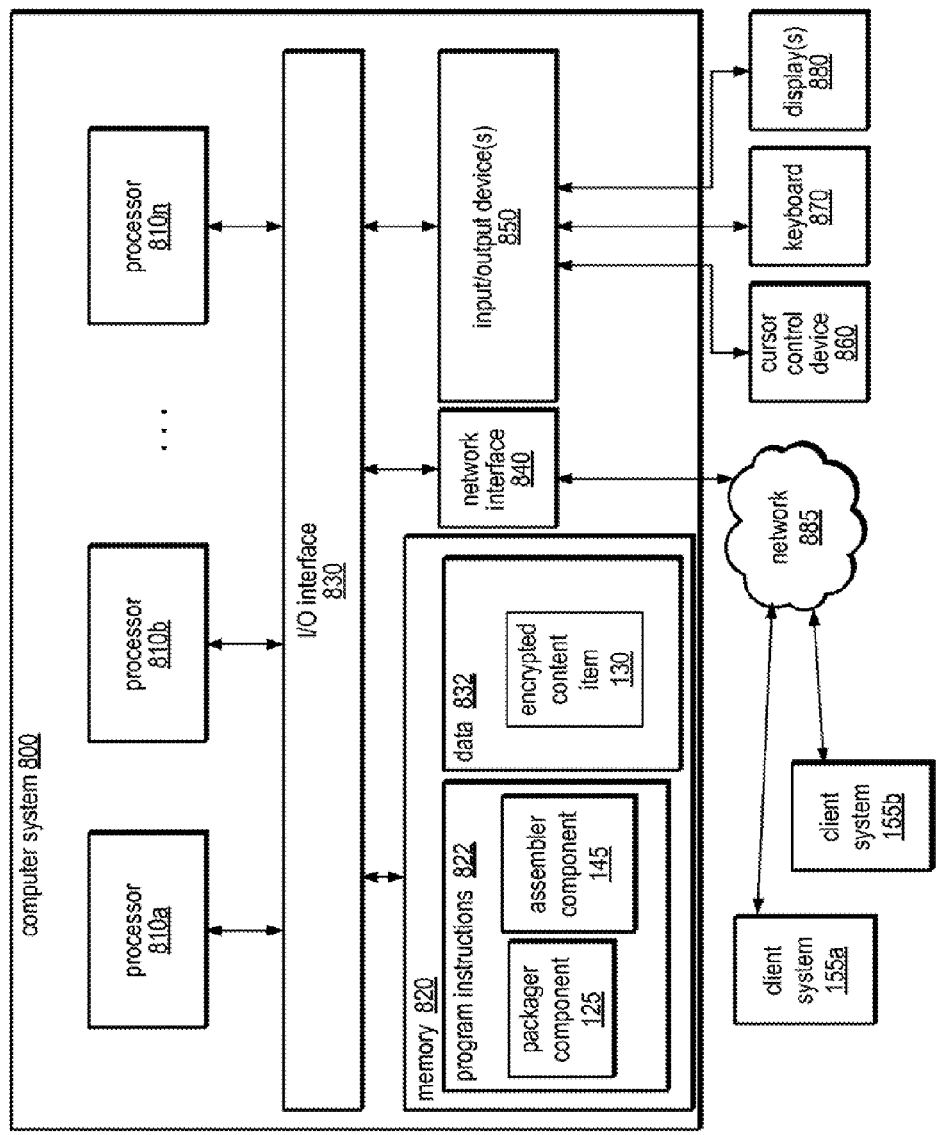
FIG. 8 illustrates an example computer system suitable for implementing various components of the system and method for decrypting content samples including distinct encryption chains, according to various embodiments.

In various instances, this detailed description may refer to a devices configured to perform content consumption, such as client system 140. In various embodiments, such a device may include but is not limited to a computing system (e.g., a desktop or laptop computer), a set-top television box, a digital audio or multimedia player (e.g., an MP3 player), a personal digital assistant (PDA), a mobile phone, a smartphone, a touchscreen phone, an e-book reader, a digital photo frame, or any other device or system configured to access, view, read, write, and/or manipulate any of the content data described herein. Any of such devices may be implemented via a computer system similar to that described with respect to FIG. 8.

Note that in various instances the description presented herein may refer to a given entity performing some action. It should be understood that this language may in some cases mean that a system (e.g., a computer) owned and/or controlled by the given entity is actually performing the action.

Note that in various instances the description presented herein may refer to a public key being associated with a private key or a public key corresponding to private key. It should be understood that such statements may mean that such a public key forms a public key—private key pair with such a private key. Additionally, in some cases, a public key—private key pair may be referred to as simply a "key pair." Note that in various embodiments, public key—private key pairs may be generated via one or more key derivation functions, such as those described above.

FIG. 1 illustrates a flow diagram of a framework in which various embodiments of the system and method for decrypting content samples including distinct encryption chains. In the illustrated embodiment, content 105 may represent a media object, which may include any type of media program that may be represented and/or stored as electronic content (e.g., electronic representations of audio, video, images, presentations or some combination thereof). In various embodiments, a media program may include prerecorded content including but not limited to movies or motion pictures, television programs, video clips or snippets, audio productions, as well as live content including but not limited to content conveying real-time or near-real time events (e.g., a live sporting event or competition). One or more encoder systems 110 may be configured to input content 105 and generate an encoded content items 115 corresponding to content 105. In various embodiments, encoder systems may encode or compress content 105 according to one or more codecs or standards for video compression in order to generate encoded content item 115. One non-limiting example of such a standard includes the H.264 standard.

For clarity of illustration, only a single encoded content item 115 is presented in the illustrated embodiment. However, it should be understood that the illustrated system may create multiple encoded content items. For instance, in various embodiments, different encoded content items may represent different temporal segments of the same media object. For example, if the media object were a movie, each encoded content item may represent a different temporal segment of that movie. Each temporal segment may be specified by a different time period of the movie, a different set of frames within the movie or a different scene within the movie, for example.

In the illustrated embodiment, encoded content item 115 may be processed by a packager component 125. In various embodiments the packager component may be implemented on a packaging system 120, which may in some cases be implemented by a computer system, such as that illustrated in FIG. 8 described below. As illustrated, the packager component 125 may package and encrypt encoded content item 125 to generate a corresponding encrypted content item 130. Additional details of the manner in which encrypted content items 130 are generated are described below with respect to FIGS. 2-3. Generally, to support different client systems, platforms or configurations, packager component 125 may be configured to generate a single encrypted content item 130 that may be assembled into multiple different content formats for different client systems without encrypting the content multiple times. As described in more detail below, the manner in which packager component 125 generates the encrypted content item may save time and/or processing resources because embodiments may require only one instance of encryption to support different content formats for different clients. In another example, the manner in which packager component 125 generates the encrypted content item may save storage resources (or reduce utilization of existing storage resources) by enabling multiple client content formats to be supported by the same encrypted content stored in a data store.

In various embodiments, the encrypted content item 130 may be provided directly to content delivery system(s) 140 and/or stored in a content data store(s) 135. In one non-limiting example, real-time or near real-time content (e.g., content for a live sporting event) may be provided to content delivery system(s) 140 whereas other content may be stored in content data store(s) 135 and retrieved by content delivery system(s) 140 at a later time. Once assembler component 145 receives the encrypted content item 130, the assembler component may assemble the encrypted content item into any of a number of formats supported by client systems 155a-b; this process may be performed without re-encrypting the content. In other words, the manner in which the packaging and assembling process is performed may preserve bit compatibility among the encrypted content of different content formats.

In the illustrated embodiment, only two client systems 155a-b are presented for clarity of illustration. It should be understood that in various embodiments, any number of client systems or devices may be supported. As illustrated, each client system 155a-b may be provided with a different version of the encrypted content item. In the illustrated embodiment, protected content item 150a and protected content item 150b may adhere to different file formats, standards or specifications. Differences between the two versions of content items are described in more detail below.

To obtain the decryption key for decrypting a protected content item, each client system may perform a license acquisition 165 with license server 160. For instance, each encrypted content item may have a metadata portion that includes an encrypted version of the content encryption key used to encrypt that content item. This encrypted content encryption key may have been encrypted with the public key of license server 160. At 165, the client system may submit this encrypted content encryption key to license server 160 as part of a license request. After the license server 160 positively authenticates the client system (if required), the license server may use its own private key to decrypt the encrypted content encryption key to determine the unencrypted version of the content encryption key. The license server may then re-encrypt the content encryption key with the client system's public key (or a public key of the application that is to consume the content) such that only that client system can properly decrypt that content encryption key. The result of this key re-encryption is provided within a response sent from the license server 160 to the client system. The client system may decrypt the encrypted content decryption key from that response with the corresponding private key. This content encryption key may be used to decrypt the protected content item received by that client system. In various embodiments, the client system may use this same content encryption key to decrypt subsequent ones of encrypted content items 130. Of course, in various embodiments, decryption keys may change over time and license acquisition can be performed again when this happens. In other embodiments, other techniques for protecting the content encryption may be utilized. For instance, in some embodiments, when the client receives the content license, the content license may already include the content encryption key protected (e.g., encrypted) for that particular client.

Figure 2:
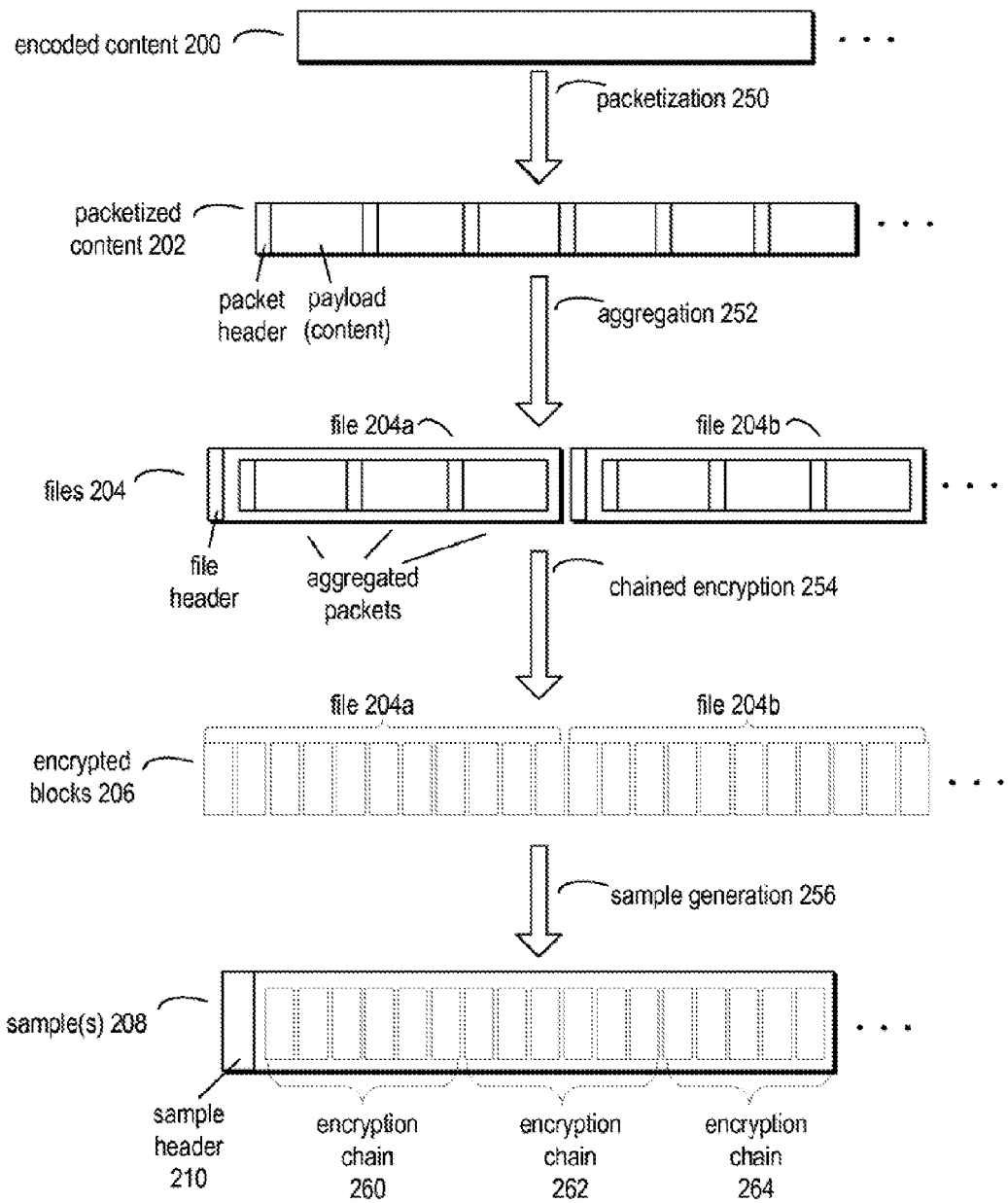
FIG. 2 illustrates an example flow diagram for the creation of different protected content formats without redundant encryption of content, according to some embodiments.

FIG. 2 illustrates an example process for generating multiple protected versions of content without redundant encryption and storage of the content. In various embodiments, the illustrated process may be performed by packager component 125 and/or assembler component 145 described above. In various embodiments, the illustrated process may be implemented on a computer system, such as computer 800 of FIG. 8. As illustrated at packetization 250, encoded content 200, such as encoded content item 115 of FIG. 1, may be packetized into packetized content 202. In some embodiments, packetizing may include parsing the encoded content into packets, each of which may include packet header information and a packet payload that includes content. In one non-limiting example, packetizing the encoded content may include generating a transport stream (TS) according to one or more standards, such as the MPEG-2 standard. In other cases, other standards or formats may be utilized to packetize the content. As illustrated at 252, an aggregation process may be performed in which sets of packets may be grouped into disparate files 204. In various embodiments, such files may be sized to provide streaming-like performance when such content is provided to a client system over one or more networks. For instance, the files may be large enough to house multiple packets but small enough such that multiple Hypertext Transfer Protocol (HTTP) requests may be submitted by a client system in order to obtain the files in a streaming-like fashion. In the illustrated embodiment, only two files 204a-b are presented for clarity of illustration. However, it should be understood that in various embodiments the packetized content may be grouped into any number of files. In some embodiments, grouping the packetized content into different files 204 may be optional.

As illustrated at 254, a chained encryption process may be performed on files 204 to create multiple encrypted blocks 206 that represent the files. In some embodiments, encrypted blocks 206 may serve as a first protected version of the content. For example, encrypted blocks 206 may represent protected content 150a of FIG. 1 described above.

Figure 3:
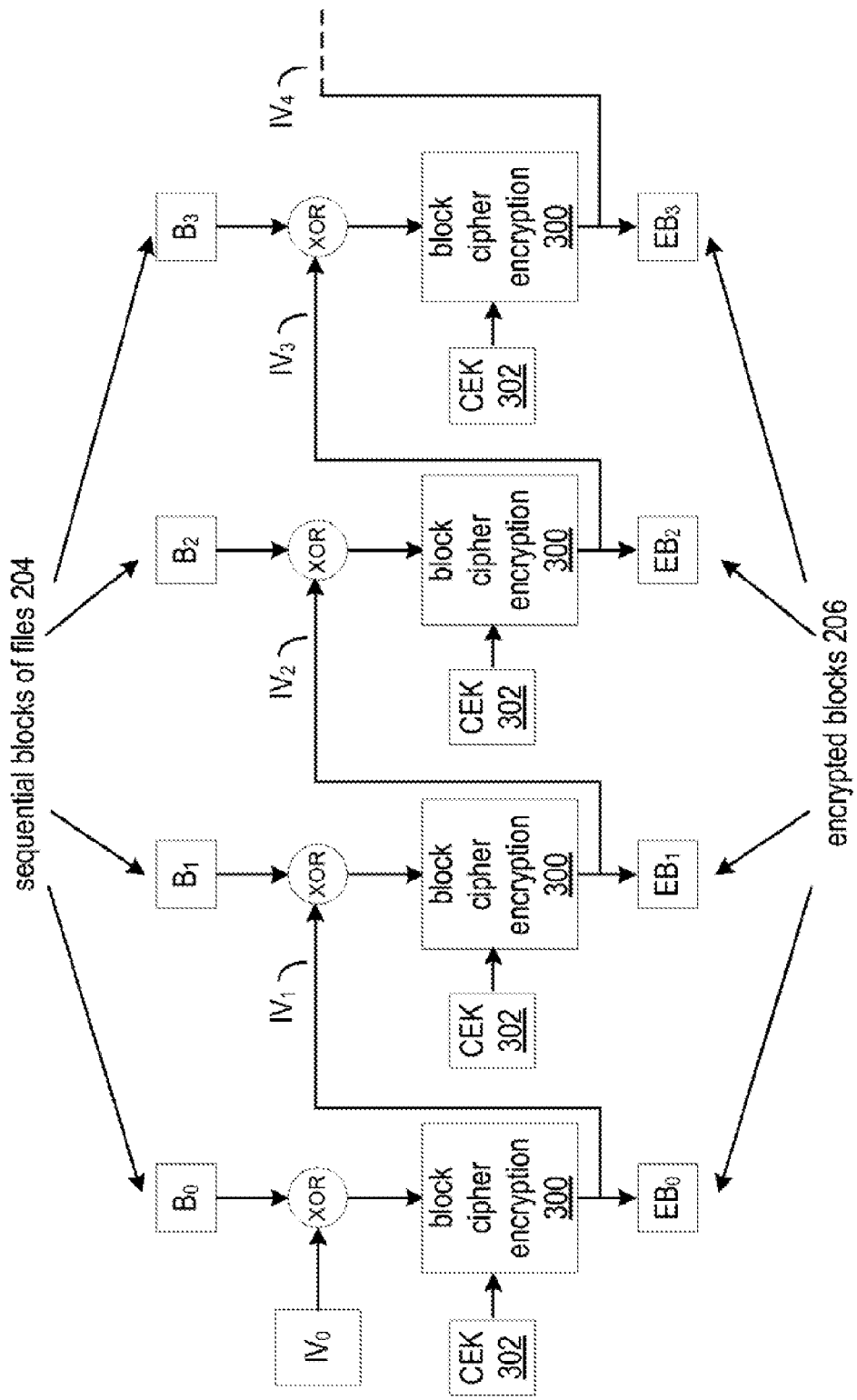
FIG. 3 illustrates one example of a chained encryption process performed on multiple blocks of content, according to some embodiments.

Referring collectively to FIGS. 2 and 3, the chained encryption of files 204 is described in further detail. FIG. 3 illustrates one example of chained encryption. As illustrated, files 204 may be parsed into a series of blocks. In various embodiments, these blocks may have a fixed width (e.g., 128 bits) dependent upon the type of encryption performed. In some embodiments, the encryption utilized may be Advanced Encryption Standard 128 bit Cipher-block chaining mode (AES-128 bit CBC mode) encryption. In other cases, other types of chained encryption may be utilized. In the illustrated embodiment, encryption may be generally performed in a sequential manner from the left to right of the Figure beginning with the first block $B_0$ and first initialization vector $IV_0$. In various embodiments, the first initialization vector $IV_0$ may be randomly or pseudo-randomly generated. However, as described in more detail below, initialization vectors for subsequent blocks may be generated such that the encryption of each subsequent block is dependent upon the previously encrypted block. In the illustrated embodiment, initialization vector $IV_0$ (which may be the same width as the block to be encrypted) and the first block to be encrypted $B_0$ may be processed by a bit-wise exclusive-or operation. In other cases, other logic operations may be utilized in place of the exclusive-or operation. The result of the exclusive-or operation may be encrypted with a content encryption key 302 using block cipher encryption 300. The result may be an encrypted block $EB_0$ having a size equal to that of the input block (e.g., 128 bits in this example).

In various embodiments, each subsequent block may be encrypted such that it is chained to the previous block. In other words, to encrypt (and thus also to decrypt) a given block, the encryption mechanism may be required to have knowledge of the previous encrypted block, according to some embodiments. The manner in which this aspect is implemented in various embodiments includes, for a given block, using the previous encrypted block as the initialization vector for the encryption of the given block. For instance, in the illustrated embodiment, the first encrypted block $EB_0$ may also be used as the second initialization vector $IV_1$. Similar to the encryption of the first block, an exclusive-or operation may be performed on $IV_1/EB_0$ and the second block $B_1$, the result of which may be encrypted by block cipher encryption 300 using content encryption key 302. The above described processes may be repeated as illustrated in order to encrypt all blocks of files 204. Returning to FIG. 2, these encrypted blocks are illustrated as encrypted blocks 206, which may represent encrypted versions of files 204a and 204b.

As illustrated at 256, content samples may be generated from encrypted blocks 206. In various embodiments, a content sample may correspond to a defined portion of content, such as an audio or video frame. However, in some embodiments, a sample may correspond to some other granularity of the content. As noted above, encrypted files 206 may be an encrypted version of files 204, which may include both content information (e.g., data representing the actual content, such as audio or video data) as well as non-content information, such as packet header (e.g., a transport header, such as that defined by the MPEG-2 standard or another standard defining a media transport stream) or file header information. However, in various embodiments, such non-content information may serve no meaningful role within the context of a sample-based file format that is not packetized or formatted according to the format of files 204. For various reasons (e.g., to avoid unnecessary overhead within the sample-based content 208), sample generation 256 may extract the encrypted blocks 206 that correspond to actual content information while disregarding non-content information. The extracted blocks may be assembled into a sample 208 as illustrated. While only one sample is presented for clarity of illustration, it should be understood that multiple samples may be generated in various embodiments. In various embodiments, this extraction process, by virtue of discarding some or all of the encrypted blocks 206 that correspond to non-content information, may break the encryption chain(s) described above. For instance, performing block-based decryption (described below with respect to FIG. 5) on the blocks of a sample that omits one or more of blocks 206 may result in an incorrect determination of initialization vectors (e.g., since initialization vectors may be dependent upon previous blocks) and thus an incorrect decryption result. However, in various embodiments, this situation may be avoided by storing the appropriate initialization vectors in the illustrated sample header 210 of one or more of the samples. For example, sample 208 is illustrated as including three different sets of encrypted blocks denoted as encryption chains 260, 262, and 264. In various embodiments, while the content of these encrypted blocks may represent a contiguous (or near contiguous) portion of content, there may exist encryption boundaries where the encryption is non-continuous (e.g., due to broken chains during the extraction of content blocks from encrypted blocks 206). Accordingly, for the first block of each encryption chain 260-264 in a given sample, the sample generation process may store the initialization vectors necessary to start the chained decryption of each chain within the sample header of that given sample. In this way, when a decryption process (e.g., on the client system) encounters an encryption boundary between the encryption chains, the encryption process may access the appropriate initialization vector from the sample header and decryption may resume.

In various embodiments, the sample generation process may select the initialization vectors that are included in the sample header through a variety of techniques. In one example, when analyzing encrypted blocks 206, for each content block that is immediately preceded by a non-content block (e.g., a block containing non-content information, such as packet header or file header information), the sample generation process may store that non-content block as an initialization vector within the sample header of the sample being generated. As described in more detail below, the initialization vectors stored in the sample header may be utilized to decrypt different chains of encrypted blocks in the respective sample.

Figure 4:
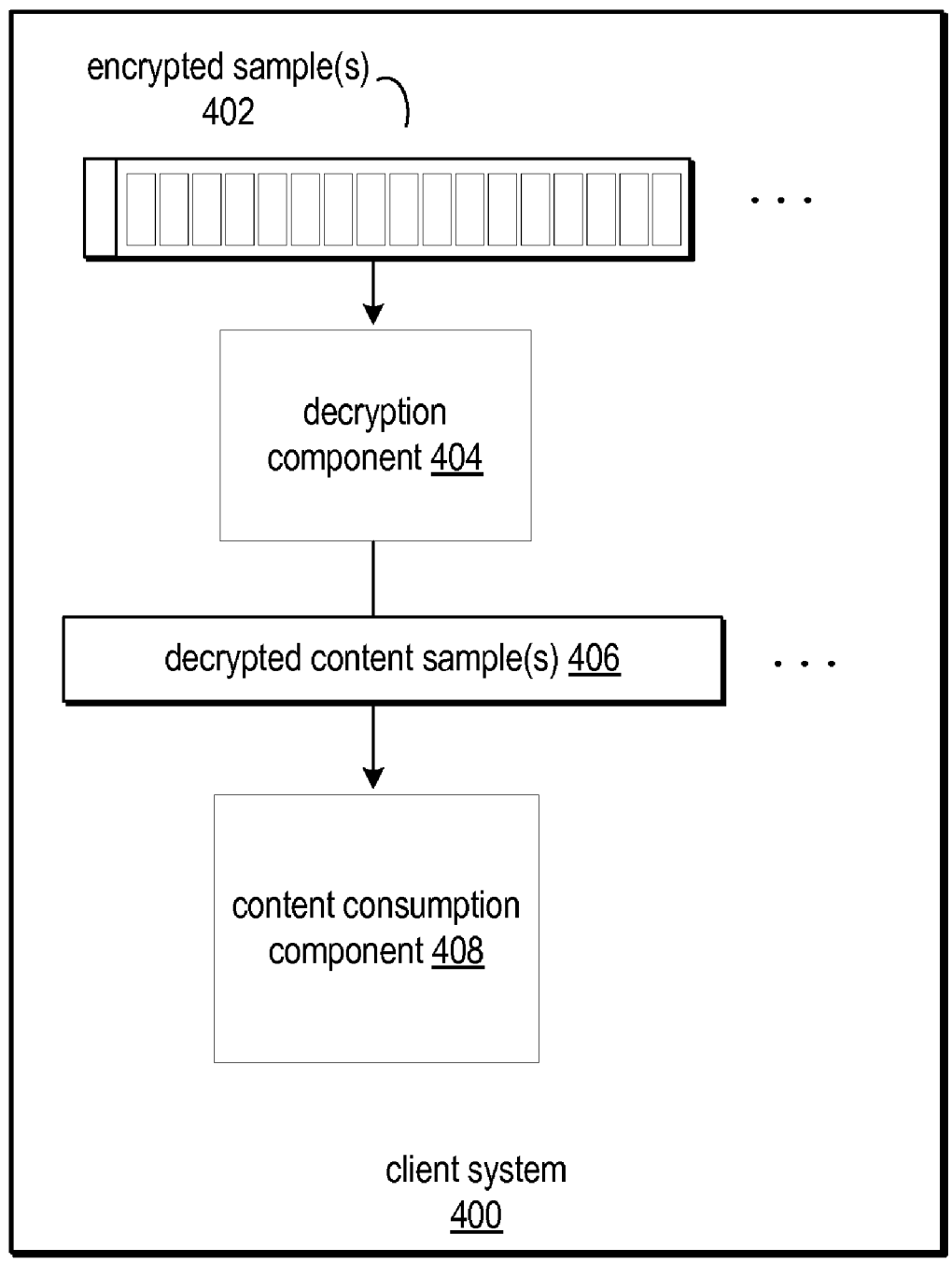
FIG. 4 illustrates a block diagram of an example client system, according to some embodiments.

FIG. 4 illustrates an example client system including decryption and consumption components, according to various embodiments. In the illustrated embodiment, client system 400 may be implemented by a computer system or other electronic devices, such as those described below with respect to the computer system of FIG. 8. In various embodiments, the client systems described above (e.g., client systems 155a-155b) may be configured in a manner similar to that of client system 400.

As illustrated, client system 400 may receive one or more encrypted samples 402, which may be configured in a manner similar to the samples described above. For example, client system 400 may receive multiple samples that represent audio and/or video frames, such as frames representing a media program (described above). For clarity of illustration, only one sample 402 is illustrated in FIG. 4. However, it should be understood that in various embodiments, the decryption and consumption techniques described below may be performed on multiple samples.

In various embodiments, decryption component 404 may be configured to perform block-based decryption on each encrypted sample. In various embodiments, to decrypt a given sample, decryption component 404 may be configured to perform the process illustrated in FIG. 5, which is described in more detail below. Generally, decryption component 404 may be configured to perform decryption on multiple blocks from a sample by using the initialization vectors from the sample header. The decrypted blocks are illustrated as decrypted content sample(s) 406, which may be consumed (e.g., played) by content consumption component 408. Content consumption component 408 may be configured to generate one or more representations of the content, such as by generating a graphical and/or audio representation of the content (e.g., on a display, speaker, and/or other device used for content consumption).

Figure 5:
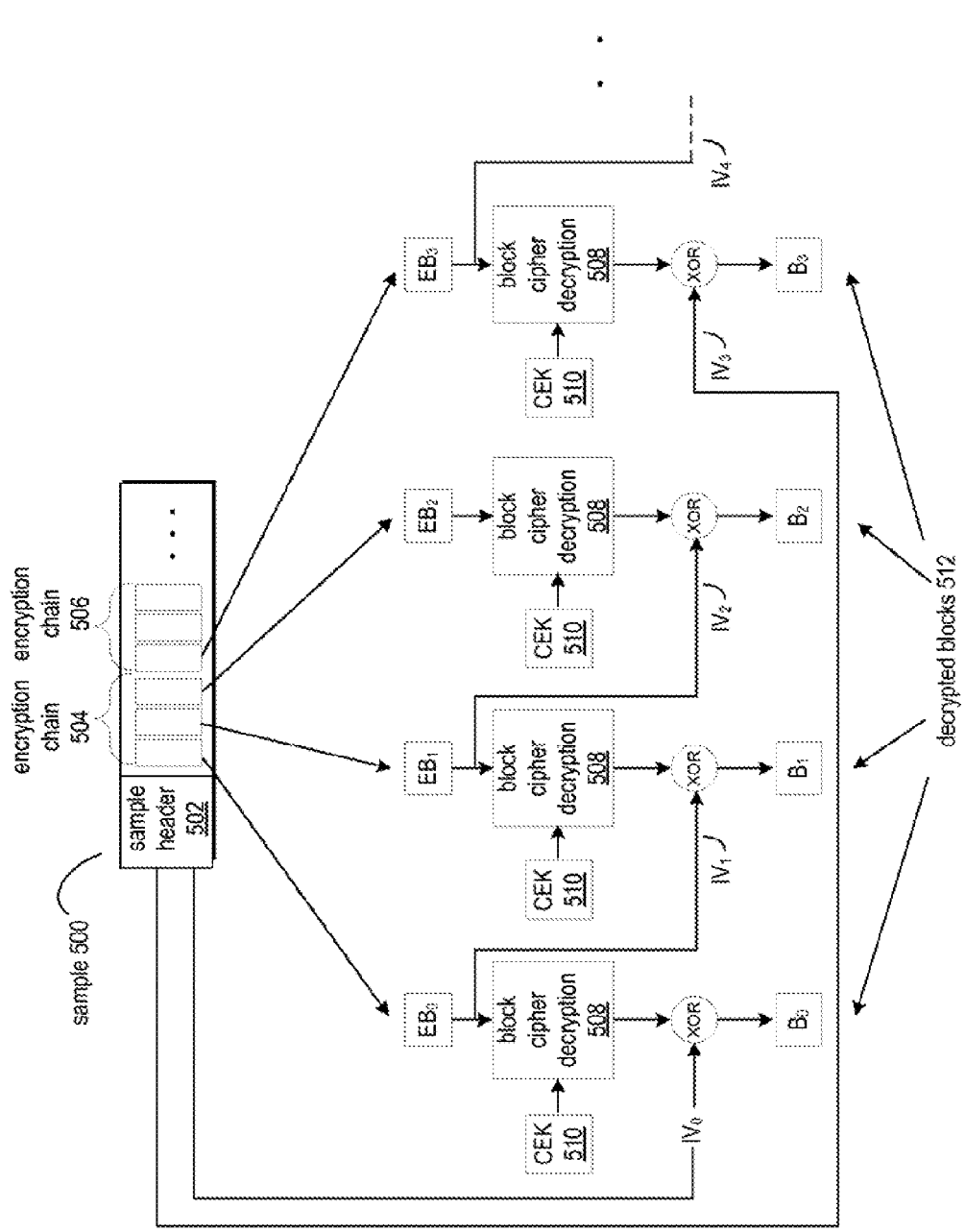
FIG. 5 illustrates one example of a chained decryption process performed on multiple blocks of content, according to some embodiments.

FIG. 5 illustrates a block diagram of the process for decrypting a given sample, according to various embodiments. The techniques of FIG. 5 may be implemented by the client systems described above. For instance, decryption component 404 may utilize the illustrated techniques to decrypt samples received on the client system. For clarity of illustration, only one sample 500 is illustrated in FIG. 5. However, it should be understood that in various embodiments, the decryption and consumption techniques described below may be performed on multiple samples. Similarly, while only two different encryption chains 504 and 506 are illustrated, any number of encryption chains may be present within a given sample in various embodiments. In the illustrated example, each encryption chain includes three blocks of encrypted content. However, in various embodiments, a given encryption chain may include any quantity of blocks, which may or may not be equal to the quantity of blocks in other encryption chains of the sample.

In the illustrated embodiment, the first encrypted block in the sample $EB_0$ may be extracted and decrypted with content encryption key 510. In various embodiments, the encrypted blocks may be symmetrically encrypted. Accordingly, content encryption key 510 may be the same as the key originally utilized to encrypt the content. In various embodiments, key 510 may be obtained through a license acquisition process, such as that described above with respect to FIG. 1. As illustrated, the first encrypted block $EB_0$ of the sample may be decrypted using the content encryption key 510. Furthermore, in accordance with chained decryption, the appropriate initialization vector $IV_0$ may be applied to the decryption result to determine the first decrypted block $B_0$ of decrypted blocks 512. In the illustrated embodiments, this is performed through an exclusive-or operation. The particular operation utilized will typically match the operation utilized to apply the initialization vector during the encryption process. As illustrated, the first initialization vector may be obtained from sample header 502. The decryption of the second and third blocks $EB_1$ and $EB_2$ to generated decrypted blocks $B_1$ and $B_2$ may be performed in a similar manner with the exception being that the initialization vectors $IV_1$ and $IV_2$ used to decrypt these blocks may be equivalent to the previous encrypted block, which is consistent with the techniques used to encrypt the blocks, such as described above with respect to FIG. 3. However, as illustrated, encrypted block $EB_3$ belongs to the second encrypted chain 506. Accordingly, block $EB_2$ cannot be utilized to as the initialization vector to decrypt block $EB_2$. In this case, the correct initialization vector IV3 may be extracted from sample header 502. (As described above with respect to sample generation 256, the initialization vectors need to start chain decryption of each chain may be stored in the sample header of each sample). In this way, the decryption process may be correctly performed across different encryption chains within the same sample.

In various embodiments, sample header 500 may include additional information to be used during decryption. For instance, for each set of blocks that represents a distinct encryption chain, sample header 500 may specify the size (e.g., in blocks or bits) and/or position of that set within the sample. Such information may be utilized by the client system for determining which initialization vectors apply to which blocks in the sample. In embodiments utilizing partial encryption, some sets of blocks may be unencrypted. For instance, in some embodiments, it may not be necessary for all sets of blocks to be encrypted. In one example, samples may be partially encrypted such that content consumption (e.g., playback) will be sufficiently disrupted for unauthorized clients (e.g., clients lacking the appropriate license and/or decryption keys), thus providing a deterrent to trying to consume the content without the proper license and/or decryption keys while also conserving computing resources and/or time. For instance this technique may conserve computing resources and/or time on the packaging side (because at least some sets of blocks are left unencrypted) and on the client side (e.g., because at least some sets of block do not need to be decrypted). As one example, consider an alternate configuration for sample 208 described above. If sample 208 were encrypted using partial encryption, at least some of the blocks may remain in the clear form whereas other blocks remain encrypted. For instance, instead of three encryption chains 260, 262, and 264, the sample may alternatively include encryption chain 260, encryption 264 and the remaining set of blocks could be left unencrypted (e.g., blocks corresponding to encryption chain 262 may be left unencrypted). In various embodiments, sample header 502 may also include information that identifies unencrypted blocks. For instance, sample header 205 may identify one or more blocks or a range of blocks that are not encrypted. Such information may be utilized by the client system for determining blocks that do not require decryption, thereby saving processing resources and/or time as described above. Any of the aforesaid information may be captured during the sample generation process 256 and stored as part of a given sample's header information.

Example Methods

Figure 6:
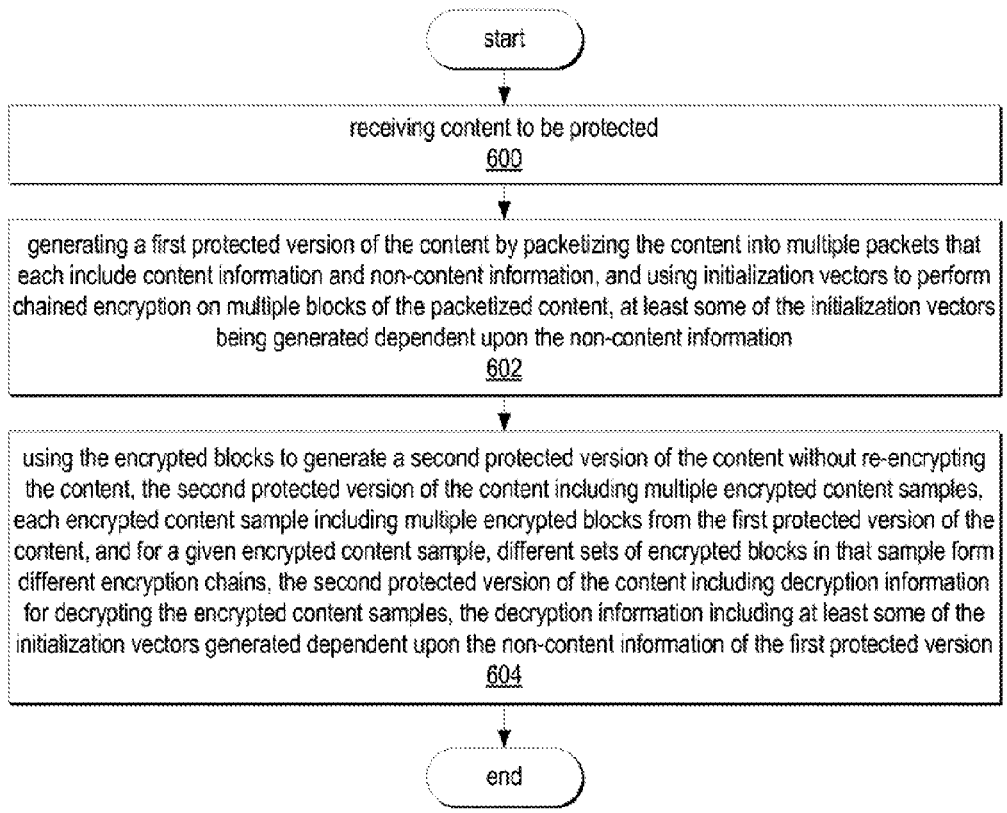
FIG. 6 illustrates a flowchart of an example method for creating different protected content formats without redundant encryption of content, according to some embodiments.
Figure 7:
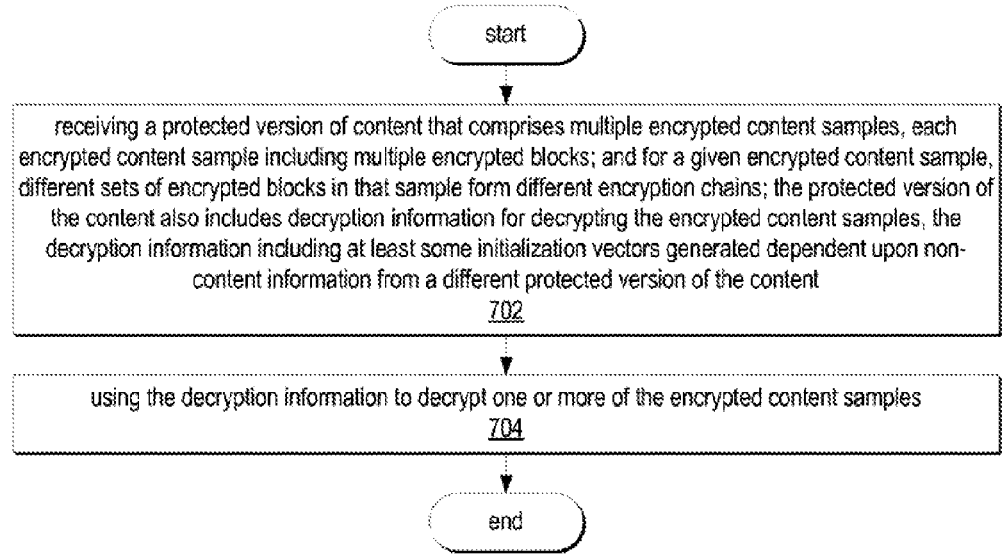
FIG. 7 illustrates a flowchart of an example method for decrypting content with initialization vectors generated dependent upon a different version of that content, according to some embodiments.

Embodiments may include various methods for generating different protected version of content without redundant encryption as well as methods for decrypting content generated according to the techniques described herein. FIGS. 6 and 7 illustrate examples of such methods. In various embodiments, the illustrated Figures may be implemented by components or systems described above. In some embodiments, the methods described herein may be implemented on one or more computer systems, such as the computer system of FIG. 8 described below.

FIG. 6 illustrates an example method for generating two different versions of protected content without encrypting the content multiple times. As illustrated at 600, the method may include receiving content to be protected. Such content may include any of the content described herein, such as encoded content 115.

As illustrated at 602, the method may further include generating a first protected version of the content (e.g., encrypted blocks 206 described above) by packetizing the content into multiple packets that each include content information and non-content information. This packetization process may include any of the packetization techniques described above, such as performing packetization 250 to create packets that include non-content information (e.g., transport stream packet headers) and content information (e.g., transport stream packet payloads including content). In various embodiments, the non-content information may include a media transport packet header, such as that defined by the MPEG-2 standard or another standard defining a media transport stream. In various embodiments, packetizing content may include formatting the content according to a media transport stream according to one or more standards, such as the MPEG-2 standard. In various embodiments, this portion of the method may also include using initialization vectors to perform chained encryption on multiple blocks of the packetized content, which may include any of the techniques described above including the encryption process described above with respect to FIGS. 2 and 3. In various embodiments, at least some of the initialization vectors used for the encryption may be generated dependent upon non-content information (e.g., packet or file headers). For example, when performing a chained encryption on blocks of packetized content, such as described above with respect to chained encryption 254, at least some of the blocks encrypted may represent non-content information including packet header or file header information.

As illustrated at 604, the method may also include using the encrypted blocks to generate a second protected version of the content without re-encrypting the content. One example of that second protected version of the content includes sample(s) 208 described above. In various embodiments, the second protected version of the content may include multiple encrypted content samples that each include multiple encrypted blocks from the first protected version of the content. For example, as described above, sample(s) 208 and 500 may include content blocks extracted from blocks 206. In various embodiments, for a given encrypted content sample, different sets of encrypted blocks in that sample may form different encryption chains. For instance, samples 208 and 500 are described above as including multiple different encryption chains.

In various embodiments, the second protected version of the content may also include decryption information for decrypting the encrypted content samples. For example, this decryption information may include the information stored in sample header 502 described above. For instance, as described above with respect to sample generation 256, the sample header may include the initialization vectors needed to begin the decryption of each encryption chain in the respective sample. In various embodiments, the decryption information may include at least some of the initialization vectors generated dependent upon the non-content information of the first protected version. For instance, as described above with respect to FIG. 3, at least some initialization vectors may be equivalent to previously encrypted blocks. Accordingly, when the previously encrypted block is an encrypted block that represents non-content information (e.g., a packet or file header), the initialization vector used to encrypt a subsequent block may be equivalent to the encrypted block that represents that non-content information. In this way, at least some of the initialization vectors of the second protected version of the content may be dependent upon information from the first protected version of the content (i.e., information not present in the second protected version of the content). By including these initialization vectors in the second protected version of the content, embodiments may prevent decryption problems associated with noncontiguous (or "broken") encryption chains.

In various embodiments, while the second protected version of the content may include initialization vectors generated dependent upon non-content information (e.g., one or more media transport stream packet headers) of the first protected version, the second protected version of the content may not include at least some of that non-content information. In some embodiments, the second protected version may include none of the non-content information of the first protected version. For instance, since the second protected version of the content may be sample-based (i.e., not packetized into a media transport stream), there may be no need in the second protected version of the content for non-content information that includes media transport header information. Accordingly, some or all of this information may be excluded from the second protected version of the content.

Note that the media transport streams described herein (and associated header and payload information of that stream) may be different than a stream of network packets. For instance, whether content is packetized into a media transport stream (e.g., according to MPEG-2) may be independent of whether that content has been packetized according to a network protocol for transporting packets (e.g., Transmission Control Protocol (TCP), Internet Protocol (IP), etc.). For instance, in some cases, content that is packetized according to a media transport stream may or may not be additionally packetized for network transport according to a network protocol. In other cases, content that is not packetized according to a media transport stream (e.g., sample-based content) may or may not be packetized for network transport according to a network protocol. It should be understood that packetization according to media transport stream protocols and packetization according to one or more network protocols may occur at different levels of standard network models (e.g., different levels of the Open Systems Interconnection (OSI) model).

In some embodiments, the encrypted content samples generated at 604 may include samples that are partially encrypted. For instance, as described above with respect to an alternate version of 208, the sample may include some sets of blocks of content that are encrypted (e.g., encryption chains) as well as one or more blocks of content that are not encrypted. As described above, using these partial encryption techniques may provide a deterrent to trying to consume the content without the proper license and/or decryption keys while also conserving computing resources and/or time.

In various embodiments of the method, the decryption information utilized may include additional information to be used during decryption. For instance, for each set of blocks that represents a distinct encryption chain, the decryption information may specify the size (e.g., in blocks or bits) and/or position of that set within the sample. Such information may be utilized for determining which initialization vectors apply to which blocks in the sample. In embodiments utilizing partial encryption, some sets of blocks may be unencrypted; the decryption information may also include information that identifies these blocks. Such information may be utilized for determining blocks that do not require decryption.

In various embodiments, by storing the initialization vectors for different encryption chains as decryption information in the second protected version of the content, embodiments may maintain bit compatibility among multiple different protected versions of the same content. In this way, embodiments avoid redundant encryption. That is, for multiple different versions of protected content, embodiments may avoid encrypting the content more than once. These characteristics may save time and or processing resources when packaging the content for different devices in accordance with different formats. Additionally, since multiple versions of the protected content may be derived from the same encrypted content, embodiments may avoid redundantly storing the encrypted content. That is, one version of the encrypted content may be stored (e.g., in memory of a computer system, such as that of FIG. 8), and other protected versions may be generated from the first version as needed or "on the fly," such as might be performed when delivering content to client systems. Even in cases where multiple protected versions of the content are stored in memory, embodiments may avoid time and processing resources associated with encrypting the same content multiple times.

In various embodiments of the method, multiple packets of the first protected version of the content may be part of a media transport stream and the non-content information of the first protected version of the content may include transport header information for that transport stream. For example, as described above, the packetized content may adhere to a media transport stream according to one or more standards, such as the MPEG-2 standard.

In various embodiments of the method one or more of the encrypted content samples may include a video or audio frame. For instance, the encrypted content samples may represent frames of any of the media programs described herein.

In various embodiments of the method, performing the chained encryption of block 602 may include encrypting said multiple blocks with one or more cryptographic keys (e.g., one or more content encryption keys or CEKs) distinct from said initialization vectors. In some cases, the same key may be utilized to encrypt all blocks. In other cases, different keys may be utilized for different sets of blocks. In various embodiments of the method, performing chained encryption on the multiple blocks may include sequentially encrypting each of a first block and multiple subsequent blocks with a respective initialization vector and cryptographic key where each respective initialization vector for each subsequent block is generated dependent upon a previously encrypted block. One example of such a configuration is illustrated and described with respect to the block-based encryption of FIG. 3. In various embodiments of the method, each block may be encrypted with a block cipher, and input to the block cipher may include a cryptographic key, an initialization vector and a block of content. The output of the block cipher may be an encrypted block, which may also be equivalent to the initialization vector for the next block to be encrypted, such as described with respect to the block-based encryption of FIG. 3.

In various embodiments of the method, the second protected version of the content additionally comprises one or more content samples that are not encrypted. For instance, embodiments may employ partial encryption to significantly protect content while at the same time preserving processing resources associated with encryption.

In various embodiments of the method, the second protected version of the content comprises unencrypted header information associated with one or more of the samples. For instance, in various embodiments of the method, for a given sample, the unencrypted header information may include one or more of information specifying whether that sample is encrypted and one or more of the initialization vectors for decryption.

In various embodiments of the method, the first protected version of the content and the second protected version of the content may adhere to different file format specifications. For instance, the two versions may be generated for different devices that support different file formats. As described above, this configuration may be accommodated without redundant encryption and storage of the content.

FIG. 7 illustrates a flowchart of an example method for content decryption, such as the decryption of sample-based content on a client system in accordance with various embodiments. In various embodiments, the illustrated method may be performed by any of the client systems described herein and/or the computer system of FIG. 8 described below.

As illustrated at 702, the method may include receiving a protected version of content that comprises multiple encrypted content samples, each encrypted content sample including multiple encrypted blocks. For instance, the method may include receiving multiple samples of content, such as samples 208 or 500 described above. In various embodiments, for a given encrypted content sample received, different sets of encrypted blocks in that sample may form different encryption chains (e.g., due to the manner in which sample generation 256 extracts content blocks and discards at least some non-content blocks). For instance, with reference to sample 500 described above, multiple different encryption chains 504-506 may be included in a sample. In various embodiments, the protected version of the content may also include decryption information for decrypting the encrypted content samples. For instance, the decryption information may include at least some initialization vectors generated dependent upon non-content information from a different protected version of the content. In various embodiments of the method, the decryption information may include additional information to be used during decryption. For instance, for each set of blocks that represents a distinct encryption chain, the decryption information may specify the size (e.g., in blocks or bits) and/or position of that set within the sample. Such information may be utilized for determining which initialization vectors apply to which blocks in the sample during decryption.

In various embodiments, while the received protected version of the content may include initialization vectors generated dependent upon non-content information (e.g., one or more media transport stream packet headers) of the different protected version, the protected version of the content may not include at least some of that non-content information. In some embodiments, the protected version may include none of the non-content information of the different protected version. For instance, since the protected version of the content may be sample-based (i.e., not packetized into a media transport stream), there may be no need in the protected version of the content for non-content information that includes media transport header information. Accordingly, some or all of this information may be excluded from the protected version of the content.

In some embodiments, the encrypted content samples of the protected version of the content may include samples that are partially encrypted. For instance, as described above with respect to an alternate version of 208, the sample may include some sets of blocks of content that are encrypted (e.g., encryption chains) as well as one or more blocks of content that are not encrypted. As described above, using these partial encryption techniques may provide a deterrent to trying to consume the content without the proper license and/or decryption keys while also conserving computing resources and/or time. In these embodiments, the decryption information described above may also include information that identifies these blocks. Such information may be utilized for determining blocks that do not require decryption. As illustrated at 704, the method may also include using the decryption information to decrypt one or more of the encrypted content samples. One example of such a decryption process includes the block-based decryption described above with respect to FIG. 5. In embodiments including partially encrypted samples, the method may include decrypting encrypted blocks that are not identified as being unencrypted by sample header information in accordance with the partial encryption/decryption techniques described herein (e.g., while not attempting decryption on blocks designated as being unencrypted by sample header information).

In various embodiments of the method, the different protected version may be a packetized version of the content comprising multiple packets, each packet comprising content information and non-content information. For instance, the different protected version may be similar to encrypted block 206 described above. In various embodiments of the method, the method may include consuming the one or more decrypted content samples in a media player application. For instance, a client system may include a media player application that is executable to playback decrypted content (e.g., on a display, speaker or other output device). In various embodiments, one or more of the decrypted content samples include a video or audio frame, such as frames of a media program as described above. In various embodiments, performing the decryption may include decrypting multiple blocks of the content with one or more cryptographic keys distinct from said initialization vectors, such as the content encryption keys of FIG. 5 described above.

Secure Communication

In various embodiments, various elements of the illustrated framework may be associated with respective public key—private key pairs, such as key pairs utilized in Public Key Infrastructure (PKI). In the illustrated framework, a first element may securely transfer data to a second element by encrypting that data with the second element's public key. In this manner, only the second element will be able to decrypt the encrypted data to access the unencrypted data, according to various embodiments. For instance, since in various embodiments knowledge of the private key may be required to decrypt the data and since the second element may be the only element that has knowledge of its own private key, the second element may be the only element able to decrypt the data with the correct private key. Note that the aforesaid techniques may in various embodiments be utilized for any transfer of data within the system of FIG. 1. One example includes the "binding" of a content license to client system at license acquisition time. For example, the license server might obtain a public key for the client system and encrypt a content license with that public key prior to transferring the license to the playback device. In this example, only client system will be able to decrypt the license (since the playback device may be the only element with knowledge of the correct private key). In some embodiments, a given element may trust another element with knowledge of its private key (thereby allowing the other element to decrypt data encrypted with the given element's public key). In various embodiments, the public keys described herein may be obtained from a public key certificate, such as a certificate provided by a certificate authority (not illustrated) in PKIs. One example of such a certificate is an X.509 certificate (in other cases, other types of public key certificates may be utilized).

Example Computer System

Various embodiments of a system and method for decrypting content samples including distinct encryption chains, as described herein, may be executed on one or more computer systems, which may interact with various other devices. One such computer system is computer system 800 illustrated by FIG. 8, which may in various embodiments implement any of the systems, devices, elements or methods illustrated in FIGS. 1-7. For instance, any of the functionality described above may be stored in memory as processor-executable executable program instructions 822 (e.g., program instructions executable by processor(s) 810). In one non-limiting example, instructions 822 may implement one or more packager components 125 or assembler components 145, as illustrated. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, program instructions 822 may be executable by the processor(s) to implement the functionality of any packaging component, assembler component, encryption component, decryption component, or client system described above. As illustrated, in various embodiments, data 832 may store one or more encrypted content items 130, from which other protected versions of the content may be generated or assembled. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the computer system, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 885), such as other computer systems (e.g., client systems 155a-b), or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the process or methods described above, such as those of FIGS. 2-3 and 5-7. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
receiving a protected version of content that comprises:
multiple encrypted content samples, each encrypted content sample comprising multiple encrypted blocks, different sets of the encrypted blocks in at least one of the encrypted content samples forming different encryption chains that have encryption boundaries between the different encryption chains at which encryption of the at least one encrypted content sample is discontinuous; and
decryption information for decrypting the encrypted content samples, the decryption information including initialization vectors, at least one of the initialization vectors included in the decryption information corresponding to a discarded encrypted block; and
applying the decryption information to decrypt one or more of the encrypted content samples.

2. The computer-implemented method as recited in claim 1, wherein the initialization vectors are generated dependent on other content information that is not included in the protected version of the content.

3. The computer-implemented method as recited in claim 1, wherein the initialization vectors are generated dependent on non-content information that is not included in the protected version of the content.

4. The computer-implemented method as recited in claim 3, wherein the non-content information is from a different protected version of the content.

5. The computer-implemented method as recited in claim 4, wherein the different protected version of the content is a packetized version of the content comprising multiple packets, each packet including content information and non-content information.

6. The computer-implemented method as recited in claim 1, wherein the one or more decrypted content samples include at least a video frame or an audio frame, and are configured for playback by a media player application.

7. The computer-implemented method as recited in claim 1, further comprising decrypting the multiple encrypted blocks with one or more cryptographic keys that are distinct from the initialization vectors.

8. A system, comprising:
a memory configured to maintain a protected version of content;
a processor system configured to execute software that is implemented to:
receive the protected version of the content that comprises:
multiple encrypted content samples, each encrypted content sample comprising multiple encrypted blocks, different sets of the encrypted blocks in at least one of the encrypted content samples forming different encryption chains that have encryption boundaries between the different encryption chains at which encryption of the at least one encrypted content sample is discontinuous; and
decryption information for decrypting the encrypted content samples, the decryption information including initialization vectors, at least one of the initialization vectors included in the decryption information corresponding to a discarded encrypted block; and
apply the decryption information to decrypt one or more of the encrypted content samples.

9. The system as recited in claim 8, wherein the initialization vectors are generated dependent on other content information that is not included in the protected version of the content.

10. The system as recited in claim 8, wherein the initialization vectors are generated dependent on non-content information that is not included in the protected version of the content.

11. The system as recited in claim 10, wherein the non-content information is from a different protected version of the content.

12. The system as recited in claim 11, wherein the different protected version of the content is a packetized version of the content comprising multiple packets, each packet including content information and non-content information.

13. The system as recited in claim 8, wherein the one or more decrypted content samples include at least a video frame or an audio frame, and are configured for playback by a media player application.

14. The system as recited in claim 8, wherein the software is further implemented to decrypt said multiple encrypted blocks with one or more cryptographic keys that are distinct from said initialization vectors.

15. A system comprising:
one or more processors; and
a memory having stored thereon instructions that are executable by the one or more processors to perform operations comprising:
receiving a protected version of content that comprises:
multiple encrypted content samples, each encrypted content sample comprising multiple encrypted blocks, different sets of the encrypted blocks in at least one of the encrypted content samples forming different encryption chains that have encryption boundaries between the different encryption chains at which encryption of the at least one encrypted content sample is discontinuous; and
decryption information for decrypting the encrypted content samples, the decryption information including initialization vectors, at least one of the initialization vectors included in the decryption information corresponding to a discarded encrypted block; and
applying the decryption information to decrypt one or more of the encrypted content samples.

16. The system as recited in claim 15, wherein the initialization vectors are generated dependent on non-content information that is not included in the protected version of the content.

17. The system as recited in claim 16, wherein the non-content information is from a different protected version of the content.

18. The system as recited in claim 17, wherein the different protected version of the content is a packetized version of the content comprising multiple packets, each packet including content information and non-content information.

19. The system as recited in claim 15, wherein the one or more decrypted content samples are configured for playback by a media player application.

20. The system as recited in claim 15, wherein the operations further comprise decrypting the multiple encrypted blocks with one or more cryptographic keys that are distinct from the initialization vectors.

* * * * *